United States Patent [19]
Zanen

[11] Patent Number: 5,532,777
[45] Date of Patent: Jul. 2, 1996

[54] SINGLE LENS APPARATUS FOR THREE-DIMENSIONAL IMAGING HAVING FOCUS-RELATED CONVERGENCE COMPENSATION

[76] Inventor: Pieter O. Zanen, 107 Cayuga Heights Rd., Ithaca, N.Y. 14850

[21] Appl. No.: 470,130

[22] Filed: Jun. 6, 1995

[51] Int. Cl.⁶ .................................................. G03B 35/08
[52] U.S. Cl. ........................ 354/114; 356/3.15; 348/49; 352/60
[58] Field of Search .................... 356/3.14; 354/114; 348/49; 352/60

[56] References Cited

U.S. PATENT DOCUMENTS

| | | |
|---|---|---|
| 3,254,933 | 1/1963 | Latulippe . |
| 3,891,313 | 6/1975 | Murphy ........................................ 353/8 |
| 4,178,090 | 12/1979 | Marks et al. . |
| 4,436,369 | 3/1984 | Bukowski . |
| 4,523,226 | 6/1985 | Lipton et al. . |
| 4,525,045 | 6/1985 | Fazekus . |
| 4,568,970 | 2/1986 | Rockstead . |
| 4,583,117 | 4/1986 | Lipton et al. . |
| 4,687,310 | 8/1987 | Cuvillier . |
| 5,349,403 | 9/1994 | Lo ............................................ 354/114 |

Primary Examiner—Mark Hellner
Attorney, Agent, or Firm—Barnard, Brown & Michaels

[57] ABSTRACT

The invention comprises an adapter having a set of four mirrors in two pairs located in front of a camera lens. The outer two mirrors face generally outward along the optical axis of the lens and the inner two mirrors face generally inward into the lens. The centers of the outer two mirrors are spaced apart by an appropriate interocular distance. The two inside mirrors are together large enough to cover the complete viewing area of the lens, each taking exactly half of the lens viewing area. The two outside mirrors are bigger then the inside pair and large enough to cover the viewing area of the inside pair to avoid viewing area reduction. The convergence of the two outer mirrors is adjustable by swiveling them simultaneously and equally about their centerlines with a ganging mechanism. The two center mirrors may be fixed, or could be adjustable by being swiveled so that one side of each remains in tight contact with the other along the optical axis of the camera lens, and each makes a 45° or lesser angle to the optical axis. The whole assembly is to be housed in a dust and light proof housing that mounts onto the lens.

21 Claims, 3 Drawing Sheets

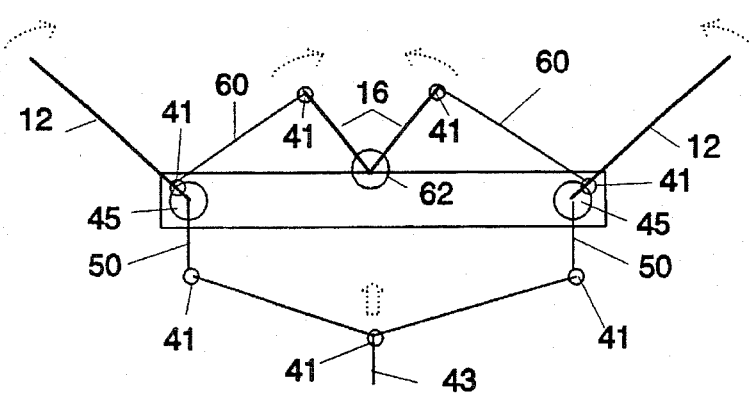
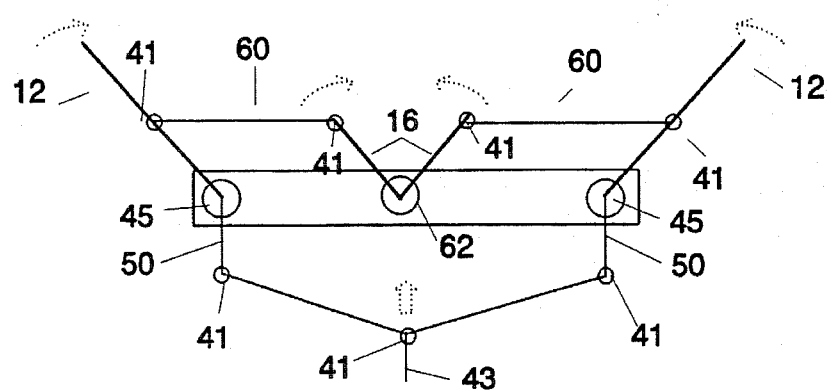
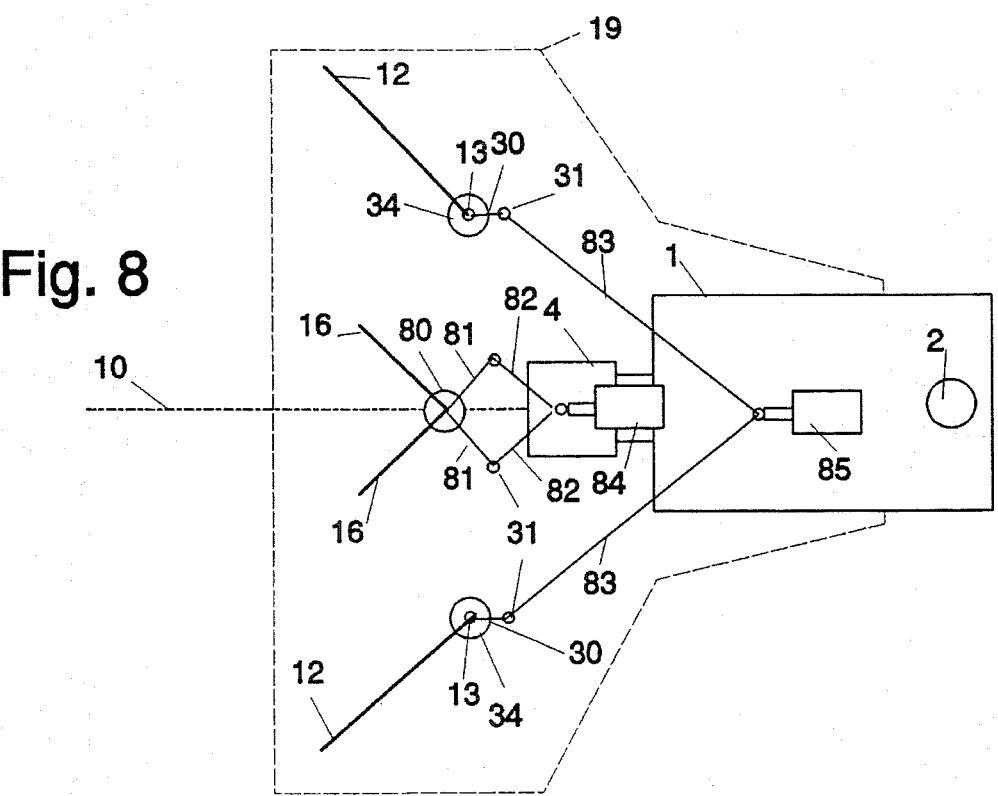

SINGLE LENS APPARATUS FOR THREE-DIMENSIONAL IMAGING HAVING FOCUS-RELATED CONVERGENCE COMPENSATION

FIELD OF THE INVENTION

The invention pertains to the field of stereographic or "3D" photography. More particularly, the invention pertains to lens attachments to permit acquisition of simultaneous left and right views using a single camera and lens, which link the convergence angle of the views with the focus or focal length of the lens.

BACKGROUND OF THE INVENTION

Stereographic photography is the method of producing images which are apparently three dimensional by recording separate left- and right-eye images. The viewer reconstructs the 3-D image by viewing the two separate 2-D images simultaneously. Stereographic photography has been known since at least the late 19th century, when stereo viewers were a popular parlor accessory.

Such stereo views have historically been created with two lenses on a single camera, spaced apart by approximately the inter-ocular distance of a human head. The Stereo Realist™ series of 35 mm still cameras, popular in the 1950's, are an example of this kind of imaging. Left and right views were recorded simultaneously through two lens/shutter sets on alternate frames of the 35 mm film. The later Nimslo™ system used four lenses for essentially the same approach.

Stereo movies appeared in the 1950's. The images were typically created either using two synchronized cameras, or a two-lens system on a single camera. Similarly, the various Stereo TV systems have typically used two cameras (see Lipton, et al, U.S. Pat. No. 4,583,117) or a single camera with two lenses (Lipton, et al, U.S. Pat. No. 4,523,226).

All of the multiple-camera systems have severe drawbacks, in the added complexity and cost of duplicating the complete camera system and the synchronization of the two separate images (this is especially a problem in film (non-video) applications). In addition, the use of two separate lenses (whether on one camera or two) introduces problems of synchronizing focus and view.

The need for solving this latter problem is real, but not addressed by prior art devices. Simply mounting two cameras side-by-side will allow the taking of the left- and right-eye images, and the cameras can be focused on whatever the subject is (although follow-focus of moving objects is problematic). However, there is more to stereoscopic vision than simply having two eyes. A simple experiment will demonstrate the problem. If one holds up a finger at arms length, and brings it closer and closer to the face, it becomes apparent that your eyes do more than merely focus on the finger as it approaches. You also aim each eye independently, becoming more and more "cross-eyed" as the finger nears the face. Without this adaptation, most 3-D films tended to induce discomfort as the apparent image distance to the view changed, since the camera views would not shift as one's instinct might expect.

In addition, fixed convergence or partially or manually adjustable convergence systems do not address the problem that the overlap of the views must change as the focus and/or focal length of the lens changes. The overlap of the two images should be maximized, especially in systems which digitize the two images and use the information to form a three dimensional picture of the surroundings.

There have been a number of devices aimed at simplifying the stereographic process by allowing use of a single camera to take the two images. Most of these use a number of mirrors or prisms, either in front of the camera lens or between a secondary lens and a pair of primary lenses.

One method, useful only with motion pictures, is to sequentially record the two images on alternate frames of the film or video. For film, a synchronized spinning mirror is used to select the view to be recorded in synch with the film gate or video scan. For such a device, see Latulippe, U.S. Pat. No. 3,254,933. In video, the system electronically selects alternate frames from two sources. This method has several disadvantages, requiring complicated synchronized glasses for viewing and being applicable only to movie or video applications.

The other alternative is to record both images simultaneously on each frame, side-by-side or one above the other. This method is applicable to any form of photography, still or moving, silver image or video. Viewing is simplified, since both images are always present, and the adapter to use a single lens does not need to be synchronized to the film transport or video scan.

Simple prism- or mirror-based stereographic adapters have been available for still cameras for some time. They fit in front of the camera lens in the same manner as an accessory close-up or telephoto adapter. They have no means for adjusting the adapter for convergence or focus as the subject-lens distance changes.

Marks, et al, U.S. Pat. No. 4,178,090, creates vertically displaced left and right images on a single frame using an attachment in front of a single lens. One image is straight-through, with the second being taken through a pair of prisms. An adjustable block in front of the lens is solid glass on the top and reflective on the bottom. Convergence is adjusted as the lens is focused by mechanically coupling a rotation control for the adjustable block and a worm gear rotating the lens focus control. This adjustment is insufficient for true automatic convergence control with focus, as only one of the two views changes angle as the block is rotated.

Bukowski (Optimax III, Inc.) U.S. Pat. No. 4,436,369, shows a mirror-based adapter using two primary lenses with ganged focusing mechanisms. Two pairs of fixed mirrors direct the left and right images to the top and bottom of the film frame. The optical axes of the lenses are parallel and fixed, which means that the convergence or aim point of the two lenses is not changed as the lenses are focused.

Fazekas (Panavision, Inc.) U.S. Pat. No. 4,525,045, also has two primary lenses and two pairs of fixed mirrors/prisms. A "horizon adjustment" is provided to allow the cameraman to move one lens to compensate for the vertical displacement of the two lenses, but the optical axes of the lenses are fixed and parallel.

Rockstead, U.S. Pat. No. 4,568,970, uses an adapter which fits in front of the lens of a television camera. Pairs of mirrors (FIG. 1) or prisms (FIG. 2) are used to create the pair of images on the video frame, and a similar device in front of the viewer's eyes reconstructs the two images back into a 3-D single image. A knob allows the operator to manually adjust the convergence of optical axes of the mirrors/prisms to create the two side-by-side images.

SUMMARY OF THE INVENTION

The invention comprises an adapter having a set of four mirrors in two pairs located in front of a camera lens. The centers of the four mirrors are all aligned on a common centerline, with the outer two mirrors facing generally outward along the optical axis of the lens and the inner two mirrors facing generally inward into the lens. The centers of the outer two mirrors are spaced apart by an appropriate interocular distance. The two inside mirrors are together large enough to cover the complete viewing area of the lens, each taking half of the lens viewing area. The two outside mirrors are bigger than the inside pair and large enough to cover the viewing area of the inside pair to avoid viewing area reduction.

The convergence of the two outer mirrors is adjustable by swiveling them simultaneously and equally about their centerlines with a ganging mechanism. The two center mirrors may be fixed, or could be adjustable by being swiveled so that one side of each remains in tight contact with the other along the optical axis of the camera lens, and each makes a 45° or lesser angle to the optical axis.

The actuating mechanism for the outer mirrors is connected to a ring that fits tight around the focusing ring of the lens, so a change in focus automatically leads to readjustment of the convergence of the images. The whole assembly is to be housed in a dust and light proof housing that mounts onto the lens.

BRIEF DESCRIPTION OF THE DRAWING

FIG. 6 is a schematic diagram of another alternate embodiment using rods to move the outer mirrors, similar to the embodiment of FIG. 4, but with the inner mirrors also adjusted.

FIG. 7 is a schematic diagram of another alternate embodiment using rods to move the outer mirrors, similar to the embodiment of FIG. 6, but with the inner mirrors adjusted at a different point, more appropriate to convergence adjustment with focal length zoom.

FIG. 8 shows another embodiment, in which servos replace the pin-and-slot mechanism of FIGS. 1 and 2.

DESCRIPTION OF THE PREFERRED EMBODIMENT

Figure 1:
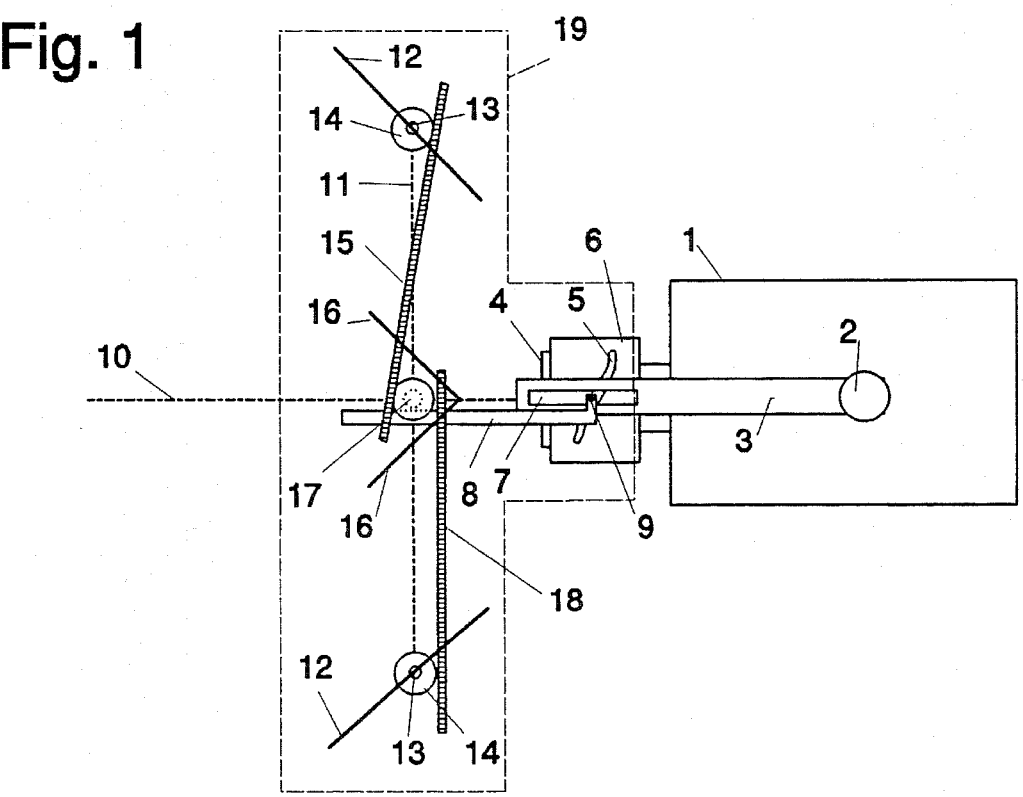
FIG. 1 shows a view of the preferred embodiment of the mechanism of the invention with automatic focus/convergence adjustment.

FIG. 1 shows a view of the invention, shown from the bottom of the camera (1). The adapter of the invention is preferably housed in a water- and dust-tight enclosure (19), which is conventional and details of which are not shown. The adapter mounts upon camera (1) along the optical axis (10) of the lens (4) by any appropriate means, such as the bar (3) and tripod screw (2). No details are shown of the camera (1), since the adapter of the invention is not specific to any particular kind of camera, still, movie or video. The various parts of the adapter of the invention are mounted upon or supported by and within the housing (19) by conventional means which are not shown, for clarity in showing and describing the novel points of the invention.

The invention uses four mirrors to create the required two images: two inner mirrors (16) and two outer mirrors (12). The outer mirrors (12) are spaced apart an appropriate distance, preferably an approximation of the average human inter-ocular distance. For specialized applications, such as surveillance or the like, the spacing can be increased within the teachings of the invention. The two images from the outer mirrors (12) are reflected to the inner mirrors (16) and into the lens (4) as a single split side-by-side image.

In the preferred embodiment of the invention shown in FIG. 1, the inner mirrors (16) are fixed in position, and the outer mirrors (12) swivel on pivots (13) at their center. Dot-dashed line (11) shows that the centers of the four mirrors are coaxial along line (11), which is perpendicular to the optical axis of the lens represented by dot-dashed line (10).

The two outer mirrors (12) are ganged together so that they rotate together, but in opposite senses (i.e. one rotates clockwise when the other is rotated counterclockwise), so that the effect is to vary the convergence of the two mirrors simultaneously and equally. In the arrangement of FIG. 1, the rotation of a central gear (17) is translated into linear movement of a first (15) and second (18) rack, which ride on opposite sides of the gear. The racks (15) and (18) then translate their linear motion back into rotation of gears (14) on each mirror (12), causing the mirrors (12) to rotate on their pivots (13).

Figure 2:
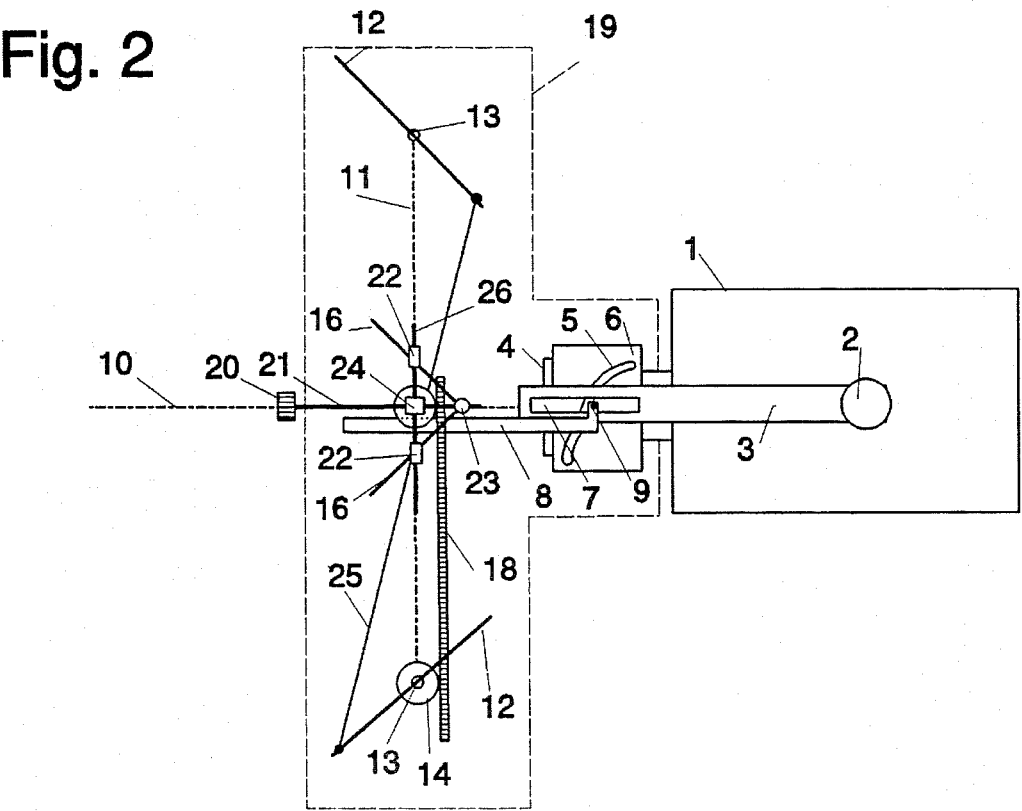
FIG. 2 shows an alternate embodiment with angle adjustment for the inner mirrors and an alternate method of tying the two outer mirrors together.

As can be seen, the first rack (15) crosses over the mirror centerline (11), to ride on the same side of its gear (14) as does the lower rack (18) on its gear (14). This is necessary to insure that the two mirrors (12) rotate in opposite senses. FIG. 2 shows another method of ganging the mirrors (12) to rotate oppositely, in which there is only one rack (18) to move one mirror (12) directly, and the other mirror is moved by cross-rod (25) which connects opposite ends of each mirror. Another possible arrangement would be to use a crossed ("figure-8") belt or chain to connect the gears on the two mirrors.

The central gear (17) is rotated by the linear in-and-out movement of rack (8). Attached to the end of the rack (8) is a pin (9), which slides along a slot (7) in mounting bracket (3). Thus, movement of the pin toward or away from the camera (1) causes the rack (8) to rotate the central gear (17), which in turn, through racks (15) and (18) pivots mirrors (12) equally in opposite directions.

The camera lens (4) has a sleeve (6) attached around its focusing ring, so that rotation of the sleeve (6) causes the lens (4) to be focused. This ring (6) could be slip-fit to the lens, or would preferably have one or more set-screws to firmly fix it to the focusing ring.

The sleeve (6) has a slot (5) machined into it, and the pin (9) on rack (8) fits into this slot. Through this arrangement, rotation of the focusing mechanism of the lens causes the sleeve (6) to rotate. The slot (5) forces the pin (9) to move the rack (8) in or out, which rotates the outer mirrors (12) accordingly as noted above.

In its simplest form, if all things were perfect, the slot (5) need only be a simple spiral groove along the sleeve (6). Unfortunately, most lenses do not focus entirely in a linear fashion. That is, a given degree of rotation of the focusing ring does not always correspond to a similar change in lens to subject distance. The adjustment of the mirror convergence may or may not follow the nonlinearity of the lens focusing in a linear fashion. Thus, it can be seen that slot (5) will need to be made non-linear as well. In FIGS. 1 and 2 it is shown in two different non-linear forms. The actual form of the slot (5) will need to be determined for each combination of lens and mirrors.

Thus, the attachment of the invention permits split-screen left/right images to be produced using a conventional single-lens camera, in which the convergence of the left and right images is automatically controlled by the focusing of the camera lens. In summary, as the lens (4) is focused by rotating the focusing ring, the sleeve (6) around the ring also rotates. A pin (9) riding in an appropriately shaped slot (5) in the sleeve (6) moves a rack (8) in or out. The motion of the rack (8) rotates a central gear (17), which, in turn, adjusts the convergence of the outer mirrors (12) through at least one rack (15). The other mirror (12) is moved simultaneously and equally in the opposite sense through a ganging mechanism. This ganging mechanism can be a second rack (18), or a simple tie (25, FIG. 2) between the mirrors.

FIG. 2 shows how the inner mirrors (16) can be adjusted, if desired, to allow for corrections of the field of view or the like. Mirrors (16) are hinged together at the point where they meet to a pivot (23) which is attached to the end of a threaded rod (21) which runs along the optical axis (10) of the lens (4). The rod has a knob (20) on its opposite end, protruding out of the case (19) to allow it to be adjusted by the user. The threaded rod (21) is threaded through a block (24) through which a slide (26) passes perpendicularly, along the centerline of the mirrors (11). The two inner mirrors (16) are mounted at their centerpoints on pivots (22) which can slide freely along the slide (26). Thus, when the knob (20) is turned, the threaded rod (21) turns within the block (24), causing the center pivot (23) at its end to be drawn closer to or further away from the block (24). As the center pivot (23) moves closer to the block, the pivots (22) slide along the slide (26), flattening the angle between mirrors (16). Similarly, if center pivot (23) is moved further away from the block (24), the pivots (22) slide inwardly, drawing mirrors (16) to a more acute angle.

Figure 3:
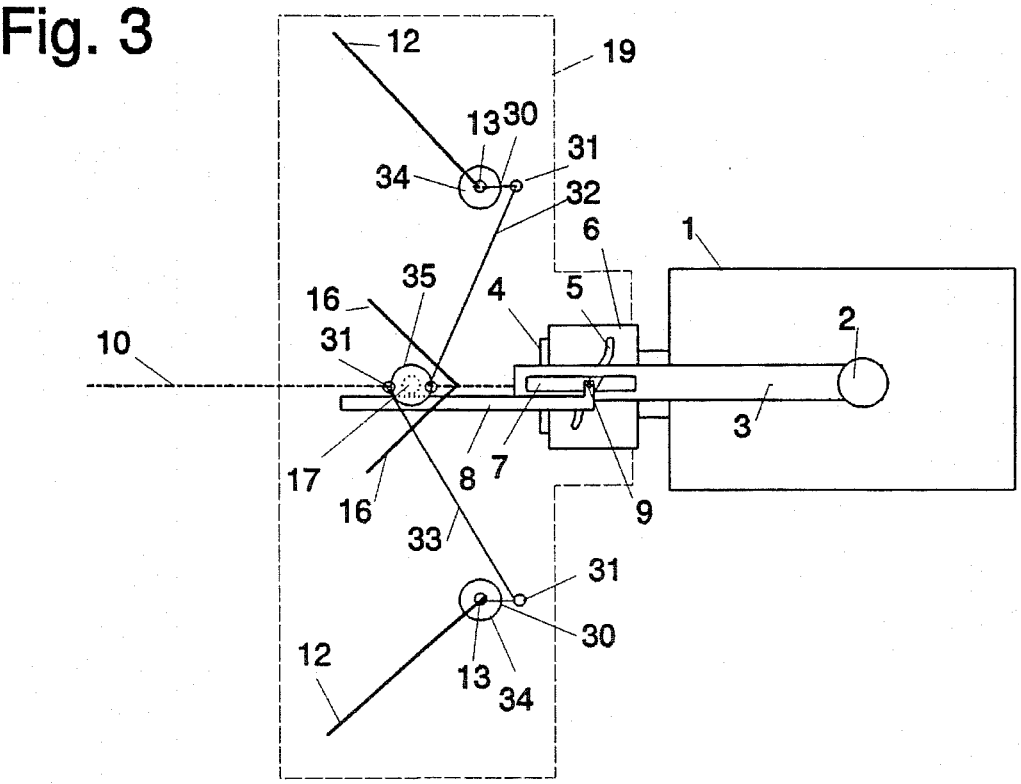
FIG. 3 shows another alternate embodiment using rods in place of gears and racks to move the outer mirrors, with the outer mirrors pivoted about a vertical axis at their inner ends rather than their centers.

FIG. 3 shows another, simpler, alternative embodiment of the invention. The activating mechanism on the lens remains the same as the preceding embodiments, through rack (8) and central disk (35). Two activating rods (32) and (33) connect diametrically opposed points on central disk (35) to offset rods (30) attached to the outer mirror (12) vertical pivots (13), which are located at the inner end of the mirrors. Pivot connections (31) ensure free movement of the rods, as the mechanism is moved. As the lens ring (4) is focused toward a subject closer to the lens, the pin (9) is moved outwards by slot (5), pushing rack (8) away. This rotates the pinion gear (17), which in turn rotates the central disk (35) counterclockwise. As central disk (35) is rotated counterclockwise, activating rods (32) and (33) move outwards, pushing on offset rods (30) and pivoting the outer mirrors (12) inward. This causes the field of view of the outer mirrors (12) to converge.

Figure 4:
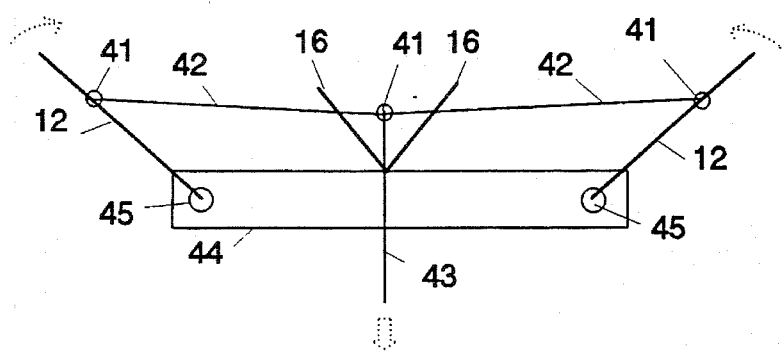
FIG. 4 is a schematic diagram of another alternate embodiment using rods to move the outer mirrors.
Figure 5:
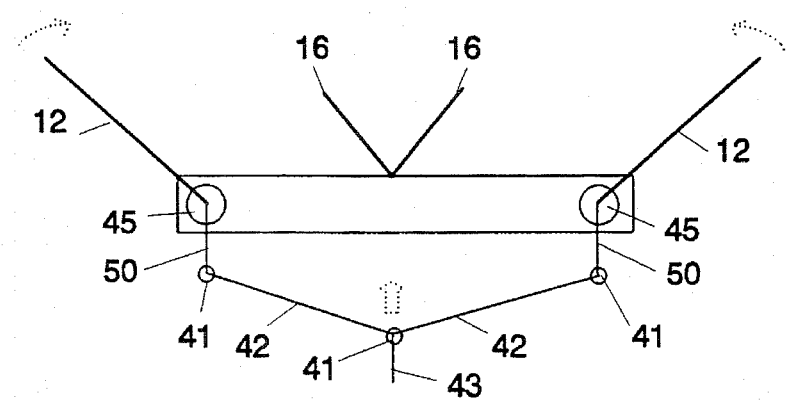
FIG. 5 is a schematic diagram of another alternate embodiment using rods to move the outer mirrors, similar to the embodiment of FIG. 4.

FIGS. 4 through 7 are schematic representations of additional embodiments of the invention. In each case, push-pull rod (43) is moved toward or away from the lens (not shown) as the lens is focused or zoomed, whether by a slot and pin arrangement as shown in the earlier figures, by servos as shown in FIG. 8, or by some other means. In each of these figures, the outer mirrors (12) are mounted by vertical pivots (45) on their inner ends to a frame (44). The inner mirrors (16) may also be mounted to the same frame (44), fixedly as shown in FIGS. 4 and 5, or by pivot (62) as shown in FIGS. 6 and 7.

In FIG. 4, the outer mirrors (12) are simply activated by extending rod (43) past the frame (44) to a pivot connection (41) at a point between the two outer mirrors (12). Activating rods (42) connect this pivot to the mirrors (12) through additional pivot connections (41) outwardly on the mirrors. As the push-pull rod (43) is drawn backward toward the lens (as shown by the dotted arrow), fields of view of the outer mirrors (12) are converged.

FIG. 5 is similar, using the same arrangement of activating rods (42) and pivot connections (41), but located behind the frame (44) and mirrors (12) and (16). The outer mirrors (12) are activated by offset rods (50), similar to those used in FIG. 3. In this case, pushing the push-pull rod (43) away from the lens causes the convergence of the fields of view of the outer mirrors (12).

FIG. 6 uses the same arrangement as FIG. 5 to move the outer mirrors (12). The inner mirrors (16) are also activated in this arrangement, by running inner mirror rods (60) from the outer ends of the inner mirrors (16) to a point close to the vertical pivot axis (45) of the outer mirrors (12).

Moving this point of attachment, as shown in FIG. 7, will allow the designer to adjust the relative movement of the inner (16) and outer (12) mirrors. In FIG. 7, the attachment point of the inner mirror rods (60) is moved to approximately the center of the outer mirrors (12), which causes the inner mirrors (16) to move more relative to the outer mirrors than the arrangement in FIG. 6. The pivot point (62) of the inner mirrors (16) is moved to a point which is in line with the pivots (45) of the outer mirrors (12). As a result of these changes from the arrangement of FIG. 6 is that the inner (16) and outer (12) mirrors remain parallel and move the same amount as the angle between the mirrors and the optical axis of the lens is changed. The FIG. 7 arrangement is useful in applications where the push-pull rod is moved in response to changes in focal length (zoom) than focus.

Some autofocus or electrically focused lenses do not have focusing rings which rotate as the lens is focused, or perhaps the focus ring is on the inside of the lens barrel or otherwise not easily accessible for a mechanical arrangement such as the slot-and-pin mechanism of FIGS. 1 to 3. The adapter of the invention can still be used with such camera systems. As shown in FIG. 8, an electrical actuator (85) such as a stepper motor, servo, or solenoid can be used to drive activation rods (83) to rotate the outer mirrors (12) through offset rods (30). Of course, this particular arrangement of rods is shown for example, and the other arrangements shown in FIGS. 1 to 7, or some other variant, could also be used. If desired, another electrical actuator (84) could be added to separately adjust inner mirrors (16), through a mechanism such as inner activating rods (82) and inner offset rods (81). The two electrical activators can be operated by electrical circuitry of any kind known to the art, such as microprocessors or discrete driver circuits, driven by the same circuitry which focuses and, optionally, zooms the lens (4). Alternatively, an activating signal could be derived from an electrical position sensor physically mounted to the lens.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A lens attachment for creation of three-dimensional images using a single lens, for use with lenses having a field of view symmetrical about an optical axis and a focusing means for focusing the lens to a selected distance, comprising:

a) a right and a left inner mirror, both inner mirrors being located in front of the lens facing inwardly along the optical axis of the lens toward the lens, covering substantially all of the field of view of the lens, the inner mirrors being connected together at one edge at the optical axis of the lens, such that the two inner mirrors form an acute angle symmetrical about the optical axis of the lens;

b) a right and a left outer mirror, both being larger than the inner mirrors and located outward of the inner mirrors, facing outward toward the subject, such that the substantially all of the field of view of the inner mirrors is covered by the outer mirrors, the outer mirrors being pivotable about a vertical axis;

c) ganging means for simultaneously pivoting the outer mirrors about their vertical axes in opposite senses, having a control input for actuating the ganging means, such that a movement of the control input causes the right and left outer mirrors to pivot equally, oppositely and simultaneously, such that a movement of the control input in one direction causes the fields of view of the outer mirrors to converge, and a movement of the control input in the opposite direction causes the fields of view of the outer mirrors to diverge; and d) adapter means for moving the control input of the ganging means in response to actuation of the focusing means of the lens, connected to the control input of the ganging means and the focusing means of the lens, such that when the lens is focused at a selected distance, the field of view of the outer mirrors converges at the selected distance.

2. The lens attachment of claim 1, in which each of the inner mirrors is mounted at an angle of 45° to the optical axis of the lens.

3. The lens attachment of claim 1 further comprising tandem means for adjusting the angle of the inner mirrors to the optical axis of the lens, such that both inner mirrors maintain the same angle to the optical axis of the lens as the angle is adjusted.

4. The lens attachment of claim 3 in which the tandem means for adjusting the angle of the inner mirrors comprises:

a) a center block located at the intersection of the optical axis of the lens and the centerline of the outer mirrors, having a first bore oriented along the optical axis of the lens, and a second bore along the centerline of the mirrors;

b) a center pivot at the point where the edges of the two inner mirrors are connected together, the connection between the two mirrors being movable;

c) a slide located on the centerline of the mirrors, passing through the second bore in the center block and centered on the optical axis of the lens, having two ends and a length sufficient that the ends of the slide extend at least past the inner mirrors on the centerline of the mirrors;

d) two sliding pivots, each having a bore through which the slide is slidably inserted, and a pivot upon which one of the inner mirrors is pivotably mounted at its centerline;

such that when the center pivot is moved along the optical axis toward the center block, the sliding pivots to which the inner mirrors are attached slide outward on the slide and the inner mirrors pivot thereon, flattening the angle between the inner mirrors and the optical axis and maintaining each inner mirror at the same angle to the optical axis of the lens.

5. The attachment of claim 4, in which the first bore of the center block is threaded; and the attachment further comprises a threaded adjustment rod having matching threads, passing through the first bore of the center block and being attached to the center pivot, such that the center pivot is moved along the optical axis of the lens as the threaded adjustment rod is turned within the threaded first bore.

6. The lens attachment of claim 3 in which the tandem means for adjusting the angle of the inner mirrors comprises:

a) a center pivot at the point where the edges of the two inner mirrors are connected together, the connection between the two mirrors being movable;

b) a first ganging rod, having a first end flexibly attached to an inner mirror near the edge of the mirror most remote from the center pivot and a second end flexibly attached to the outer mirror located on the same side of the optical axis of the lens;

c) a second ganging rod, having a first end flexibly attached to the other inner mirror near the edge of the mirror most remote from the center pivot at the same point of attachment as the first end of the first ganging rod is attached to its inner mirror, and a second end flexibly attached to the outer mirror located on the same side of the optical axis of the lens at a point on the outer mirror which is the same point at which the second end of the first ganging rod is attached to its outer mirror;

such that when the outer mirrors are moved upon their pivots, the first and second ganging rods cause the inner mirrors to move equally, oppositely, and simultaneously.

7. The attachment of claim 6, in which the point of attachment of the second end of the first and second ganging rods to the outer mirrors is near the center of the outer mirrors.

8. The attachment of claim 6, in which the point of attachment of the second end of the first and second ganging rods to the outer mirrors is near the pivot point of the outer mirrors.

9. The attachment of claim 1, in which the ganging means comprises:

a) a center pinion gear located on the centerline of the mirrors;

b) a mirror pinion gear located at the vertical axis of one of the outer mirrors, such that turning the mirror pinion gear pivots the outer mirror along its vertical axes;

c) a rack operatively connecting the center pinion gear to the mirror pinion gear, such that turning the center pinion gear moves the rack linearly, causing the mirror pinion gear to rotate and pivot the outer mirror; and d) tying means for causing the other outer mirror to move equally and oppositely to the outer mirror having the mirror pinion gear.

10. The attachment of claim 9 in which the tying means for causing the outer mirror to pivot comprises a ganging rod connected to one end of the right outer mirror and to the opposite end of the left outer mirror.

11. The attachment of claim 9 in which the tying means for causing the outer mirror to pivot comprises a second mirror pinion gear and a second rack connecting the center pinion gear to the second mirror pinion gear, such that turning the center pinion gear moves the second rack linearly, causing the second mirror pinion gear to rotate and pivot the outer mirror equally and oppositely to the pivoting of the other outer mirror.

12. The attachment of claim 9 in which the control input of the ganging means comprises a control rack connected to the center pinion gear, such that linear movement of the control rack causes the center pinion gear to rotate.

13. The attachment of claim 1 in which the adapter means for moving the control input of the ganging means in response to actuation of the focusing ring of the lens comprises:

a) an adapter sleeve surrounding at least part of the focusing ring of the lens, connected thereto for rotation therewith, having a spiral groove impressed therein;

b) a pin located on the control input;

c) the pin being held in the spiral groove of the adapter sleeve, such that rotation of the adapter sleeve causes the pin to be moved linearly and proportionally to the rotation of the adapter sleeve.

14. The attachment of claim 13, in which the spiral groove is configured such that the linear motion of the pin causes the ganging means to pivot the outer mirrors such that the field of view of the outer mirrors converges at the selected distance of focus of the lens as the distance of focus is changed by focusing the lens.

15. The attachment of claim 1, in which the ganging means for pivoting the outer mirrors comprises a pair of rods having outer ends attached to the outer mirrors, spaced a distance from the vertical axis about which the outer mirrors are pivoted, and inner ends connected to each other and to an actuating rod located parallel to the optical axis of the lens.

16. The attachment of claim 1, in which the vertical axis about which the outer mirrors pivot is located at the inner end of the outer mirrors, the outer mirrors further comprise an offset rod having a first end connected to the outer mirror at the vertical axis thereof, and extending rearwardly from the pivot, and having a second end, and the ganging means for pivoting the outer mirrors comprises a pair of rods having outer ends attached to the second end of the offset rods, and inner ends connected to each other and to an actuating rod located parallel to the optical axis of the lens.

17. The attachment of claim 1, in which the adapter means comprises an electrical actuator having an electrical input for an electrical signal representative of the focus of the lens and a mechanical output connected to the control input of the ganging means, having a movement responsive to the electrical signal on the electrical input, such that the electrical signal representative of the focus of the lens adjusts the convergence of the mirrors appropriately to the point of focus of the lens.

18. The attachment of claim 17, in which the electrical actuator is a solenoid.

19. The attachment of claim 17, in which the electrical actuator is a stepper switch.

20. The attachment of claim 17, in which the electrical actuator is a servo.

21. The attachment of claim 1 in which the lens is a variable focal length lens, and the adapter means is moved in response to the change in focal length of the lens.

* * * * *